United States Patent [19]

Zaharko

[11] Patent Number: 4,569,859

[45] Date of Patent: Feb. 11, 1986

[54] PROCESS FOR FORMING PRILL FOR SULPHUR AND BENTONITE

[75] Inventor: Russell J. Zaharko, Calgary, Canada

[73] Assignee: Sulpetro Limited, Calgary, Canada

[21] Appl. No.: 629,438

[22] Filed: Jul. 10, 1984

[51] Int. Cl.$^4$ .............................. C05G 3/04; B05D 7/00
[52] U.S. Cl. ............................................ 427/215; 71/3;
71/54; 71/62; 71/64.07; 71/DIG. 1;
106/287.32
[58] Field of Search ................. 71/3, 54, 62, 64.07,
71/DIG. 1; 106/287.32; 427/215

[56] References Cited

U.S. PATENT DOCUMENTS 4,133,669  1/1979  Caldwell et al. ........................ 71/3
4,394,150  7/1983  Garrison et al. ............ 106/287.32 X Primary Examiner—Michael R. Lusignan
Attorney, Agent, or Firm—Stanley G. Ade

[57] ABSTRACT

A process for prilling a mixture of sulphur and bentonite to produce a water-degradable prill includes adding dry bentonite in powdered form to molten sulphur at a temperature to provide a molten sulphur-bentonite mixture, forming droplets of the mixture, providing a quenching solution of either sodium chloride, sodium sulphate, potassium chloride or potassium sulphate at a temperature low enough to solidify the sulphur-bentonite mixture, feeding the droplets into the quenching solution, passing the droplets through the quenching solution for a time and at a temperature of the quenching solution sufficient to anneal the droplets into prills, and removing the annealed prills from the quenching solution and drying the prills to a specified temperature and moisture content. This invention relates to new and useful improvements in the process and resultant product of forming prills from sulphur for fertilizing purposes, and to reducing the dust normally present with prills made entirely from sulphur.

17 Claims, 1 Drawing Figure

PROCESS FOR FORMING PRILL FOR SULPHUR AND BENTONITE

BACKGROUND

In order for sulphur to be used as a soil additive it is essential that the sulphur be in a finely divided form and it is known to provide such prills by mixing sulphur with certain mineral clays such as bentonite.

It is well known to mix bentonite with molten sulphur and to pour the mixture into sheet form and, when it has cooled, comminute same, and separate to a predetermined particle size, but unfortunately excessive dust is produced both in the formation of the product and in the end product itself.

It is also known to produce a mixture of molten sulphur and bentonite in a pellet or prill form, and in order to prevent the undesirable premature swelling of the bentonite, to quench same in a liquid fertilizer rather than quenching the prills in water. An example of this is U.S. Pat. No. 4,133,669. Unfortunately, utilizing a liquid fertilizer coolant to form the prills results in an annealing process which is not entirely satisfactory, is difficult to control and does not give the desired compressive strength to the prill to prevent breakage during handling.

SUMMARY OF THE INVENTION

The present invention overcomes disadvantages inherent with prior art teachings and in accordance with the invention, there is provided a process to produce prills of a bentonite and sulphur mixture, that are degradable in water, and which consists of the steps of adding 1% to 15% dried bentonite by weight to 99% to 85% molten sulphur by weight with continuous and thorough shear mixing at a temperature between 238° F. and 318° F., forming droplets of the mixture, providing a quenching solution selected from a group consisting of sodium chloride, sodium sulphate, potassium chloride and potassium sulphate, passing the droplets through the quenching solution for a time sufficient to anneal the droplets into prills, and then removing the annealed prills from the solution and fluidized air drying them at a temperature of between 150° F. and 212° F. so that they contain less than 0.5% water by weight with a preferred content being less than 0.1% water by weight.

It will of course be appreciated that the above limitations are approximate and that there are preferred temperatures and the like as both will hereinafter be explained.

This process, particularly using the quenching solution mentioned, inhibits the bentonite from swelling during storage and gives the prills the required compressive strength to maintain their integrity during storage and transportation with the absolute minimum production of dust during the handling thereof.

Another advantage of the invention is to provide a process and product in which the size can be varied depending upon design parameters and in which the final moisture content may be strictly controlled to further inhibit any premature swelling and subsequent degradation of the prills until used.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWING

In the drawing, like characters of reference indicate corresponding parts in the different figures.

Figure 1:
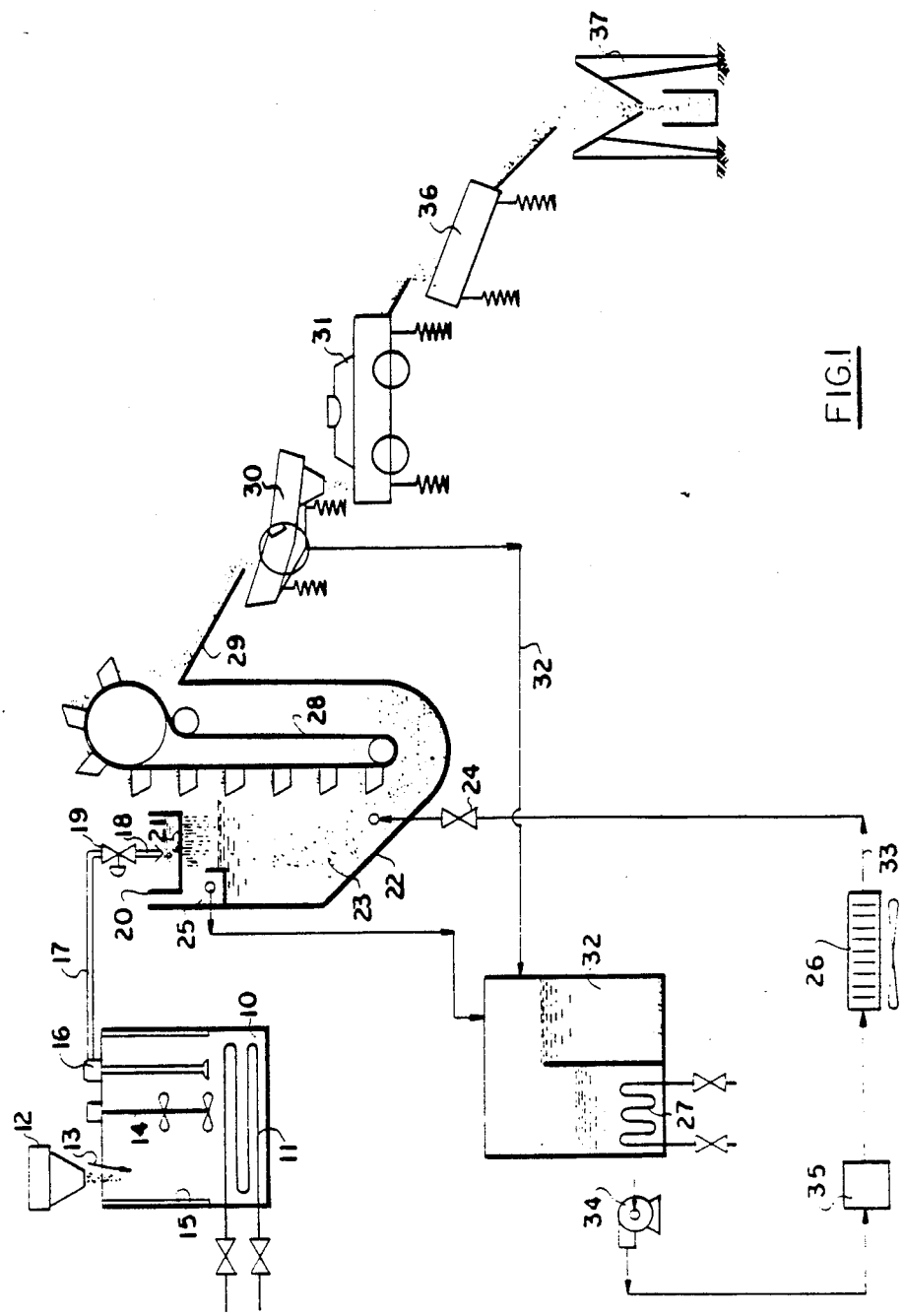
FIG. 1 is a schematic diagram of the process of forming the prills of the present invention.

Proceeding therefore to describe the invention in detail, reference should be made to the drawing which shows the apparatus schematically and includes a mix tank 10 heated by steam coils 11 in order to maintain a mix temperature of between approximately 238° F. and 318° F. The preferred temperature is approximately 265° F.

The mixture within tank 10 consists of between 1% and 15% bentonite by weight and between 99% and 85% of molten sulphur.

The bentonite should be in powdered form and of a dry lattice expanding type containing montmorillonite with the preferred amount of montmorillonite exceeding 70% by weight. The moisture content may exceed 3% by weight, but is preferably less than 3% by weight.

The bentonite is added in dust form at ambient temperature from hopper 12 with sulphur being added to mix tank 10. It is mixed slowly so that the temperature of the mixture is not lowered too rapidly and, as mentioned previously, the mixture within the tank should be maintained at a temperature of approximately 265° F. and a continuous shear mixing by means of mixer 14 and shear plate or baffles 15 in order to prevent separation of the bentonite. Sulphur temperature is important to prevent the sulphur from solidifying and for maintaining the sulphur at the desired viscosity. Excessive temperatures not only increase the sulphur viscosity, but also causes excessive polymerization and therefore eventual poor degradation.

As mentioned previously, without continuous shear mixing induced by mixer 14 in conjunction with shear plate or baffles 15 within the tank, the bentonite will settle out.

The degradable characteristics of the resultant sulphur-bentonite prills may be varied by increasing or decreasing the ratio of bentonite that is added to the sulphur and the efficiency of drying. In general, large amounts of bentonite will cause the sulphur to degrade faster (in the present context, it is to be understood that degrading means to reduce to smaller particles). Furthermore, the low content of water in the final dry prill will improve the prill's characteristics to absorb free water.

The bentonite particle size used is preferably of the size so that between 95% and 98% will pass through 200 mesh U.S. Standard screen. However, bentonite particle size may vary between what passes through an 80 mesh screen and what passes through a 325 mesh screen with a higher percentage passing through the 325 mesh screen. In fact, it is desirable that between 75% and 98% of the bentonite pass through the 325 mesh screen. The swelling capability of the bentonite should be in a range from about 15 to 30 times. Small amounts of catalysts, such as sodium carboxymethyl cellulose or soda ash, may be added to the bentonite to increase its swelling capability with the result being that the catalyst will speed up the degrading time of the sulphur-bentonite mixture when used.

When thorough mixing has occurred in tank 10 and the desired temperature has been obtained, pump 16 pumps the mixture through feed line 17 to discharge control valve 19.

Reference character 20 illustrates a stainless steel tray with a matrix of holes in the base 21 thereof. It is this tray which forms the liquid mixture into the streams which eventually form the prills and such a structure is well known and conventional in the art.

The diameter of the holes in the tray may vary between 3/64" and 7/64" depending upon the diameter of prills required as a final product. However it has been found that the preferred opening is a circle having an approximate diameter of 4/64".

The flow control valve 19 is adjusted so that the level of the molten mixture within the tray is between approximately ½" and 2" above the base 21 with the molted sulphur-bentonite mixture being maintained in the range of approximately 238° F. to approximately 318° F. Steam heating coils or other forms of heating may be provided to prilling tray 20 in order to prevent solidification of the sulphur-bentonite mixture in the prilling tray holes. However heating of the tray is not essential and only would be beneficial during start-up, as the heat from the molten sulphur-bentonite mixture is normally sufficient to prevent the solidification of same within the prilling tray holes.

Prilling tank 22 is provided with a supply of liquid quenching solution 23 and in accordance with the principles of this invention, the liquid quenching solution comprises a chloride or sulphate solution mixture mixed with water in order to maintain a specific gravity of between 1.001 and 1.08. The quenching solution is preferably formed by selecting one of the group consisting of potassium chloride, potassium sulphate, sodium chloride, and sodium sulphate with the preferred quenching solution being made from potassium chloride. It has been found that such quenching solutions prevent premature swelling of the prills and provide sufficient compressive strength to prevent break-down and powdering prior to application.

Quenching solution 23 is supplied to tank 22 through inlet valve 24 with the level within tank 22 being regulated by weir gate 25. The temperature range of the quenching solution is maintained preferably between approximately 40° F. and approximately 100° F., being controlled by heat exchanger 26 and steam heating coils 27 or other conventional heating means as will hereinafter be described.

To form the sulphur-bentonite prills, the sulphur-bentonite mixture passes through the holes in tray 20 to form a homogenous stream which falls into quenching solution 23. The quench solution forms a cooling zone and, as the stream enters the cooling zone, droplets are formed. The droplets are annealed to relatively hard smooth prills by the time they reach the bottom of prilling tank 22 at which time they are picked up by means of bucket elevator 28 or the like and the annealed sulphur-bentonite prills along with a small amount of quench solution are discharged out of the top of prilling tank 22 on to chute 29 which directs the prills onto vibrating screen 30 which separates the prills and the quench solution. The quench solution is fed by gravity back into settling tank 32 by means of conduit 38.

The prills then enter a fluidized hot-air dryer 31 which includes a source of heat, a heat exchanger, a method of conveying the prills and a method of circulating air, such as a fan. Any suitable components may be utilized for vibrating screen assembly 23, and the fluidized hot-air dryer 31. As details of these components do not form a part of the invention, it is not believed necessary to describe same further except to say that they are available commercially and are conventional for various purposes. However, it should be noted that the fluidized hot-air dryer 31 should furnish hot dry air to be blown over the prills as moist air would not dry them sufficiently and that the temperature of the drying air should be between approximately 150° F. and 212° F. and retention time shall be such to dry the prills to lower than 0.5% moisture content.

Loss of quenching solution 23 through evaporation may be made up by adding more water and more chloride or sulphate crystals to settling tank 32. The quench solution is circulated from tank 32 along the conduit 33 by pumping means such as pump 34 through filter 35. The purpose of the filter is to remove fine traces of bentonite from the solution which could effect the efficiency of the quenching process. Air circulating, such as a fan, drives air upward over heat exchanger 26 to effect cooling of the solution to the desired temperature range. If the quenching solution is too cold, then steam heating coils 27, within settling tank 32, may be used to heat the solution to the desired temperature.

The desired size of prills is in the range of 1.0 mm to 5.0 mm in diameter and a combination of factors determine prill size and quality.

SIZE (1) The "head" or pressure forcing the sulphur-bentonite mixture through the holes in prilling tray 20.
(2) The hole size in prilling tray 20.
(3) The temperature of the molten sulphurbentonite mixture.
(4) The height of the bottom of tray 20 above quenching solution 23.

QUALITY (1) Sulphur-bentonite composition.
(2) Sulphur temperature.
(3) The quenching solution temperature.
(4) The specific gravity thereof.
(5) The amount the solution may have been contaminated by bentonite.
(6) The final moisture content of the prills immediately after the fluidized hot-air dryer 31.

The preferred temperature range has been discussed previously. The preferred pressure range is attained by adjusting control valve 19 to provide a liquid "head" in prilling tray 20 from about ½" to approximately 2" and the preferred hole size is, as mentioned previously, in the range of approximately 3/64" to 7/64" in diameter.

It is also preferable that the free fall distance between base 21 of tray 20 and the surface of quenching solution 23 controlled by weir gate 25, should be maintained at a minimum and the preferred range of free fall distance is approximately ½" to 2" vertical drop.

As mentioned previously, when the prills are removed from quenching solution 23 in tank 22, they are dried before being stored. The prills should be dried to a point where they contain less than 0.5% water by weight. At this point, the prills contain less moisture than ambient air and therefore are super dry. These super dry prills leaving the dryer 31, are screened into different sizes by conventional sizing screens 36 and are immediately packed in air-tight bags as illustrated at 37, or stored in humidity controlled bins for transportation and blending with other types of fertilizer.

It would therefore be appreciated that there has been described a process for the manufacture of a water-degradable sulphur product, which product is essentially dust free, is extremely durable due to the quenching process increasing the compressive strength thereof, and has good degradation characteristics once exposed to moisture in the soil.

Since various modifications can be made in my invention as hereinafter described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A process for the manufacture of solid pellets or prills of a water-degradable homogenous suspension of bentonite in sulphur which gives the pellet or prill the required compressive strength whereby the crushing and swelling of the bentonite is inhibited during manufacture, handling and storage, comprising the steps of:
   (a) Adding 1% to 15% by weight of substantially dry powdered bentonite to 99% to 85% of molten sulphur with continuous and thorough shear mixing in a tank at a temperature of between approximately 238° F. and 318° F.;
   (b) Forming droplets of mixture;
   (c) Providing a non-degrading quenching solution of a chloride or sulphate water mixture selected from the group consisting of sodium chloride, sodium sulphate, potassium chloride and potassium sulphate, having a specific gravity between 1.001 and 1.08;
   (d) Feeding said droplets into said quenching solution;
   (e) Passing said droplets through said quenching solution for a time sufficient to anneal the droplets into prills;
   (f) Removing said annealed prills from said solution, and
   (g) Drying them at a temperature of between 150° F. and 212° F. to contain less than 0.5% water by weight with the preferred water content to be less than 0.1% by weight.

2. The process according to claim 1 wherein said quenching solution is maintained at a temperature range in excess of 40° F. up to approximately 100° F.

3. The process according to claim 1 which further includes the step of drying the prills with hot dry air after removal from the quenching solution to said water content of less than 0.5% by weight with the preferred water content to be less than 0.1% by weight.

4. The process according to claim 2 which further includes the step of drying the prills with hot dry air after removal from the quenching solution to said water content of less than 0.5% by weight with the preferred water content to be less than 0.1% by weight.

5. The process according to claim 1 wherein the droplet-forming step includes providing a removable tray having a matrix of holes created throughout.

6. The process according to claim 5 wherein the size of said holes is between approximately 3/64" to 7/64" with the preferred size being approximately 4/64".

7. The process according to claim 5 wherein the droplet-forming step further includes the step of providing a substantially constant pressure head of said mixture above said tray.

8. The process according to claim 7 wherein said pressure head is the range from approximately ¼" up to approximately 2".

9. The process according to claim 1 wherein the droplet feeding step includes allowing the droplets to freely fall from said tray to quenching solution.

10. The process according to claim 9 wherein the free fall distance is in the range of approximately ½" to approximately 2" vertical distance.

11. The process according to claim 1 in which the shear mixing temperature is maintained between approximately 238° F. and 318° F. with the preferred temperature being approximately 265° F.

12. The process according to claim 1 in which the bentonite contains montmorillonite preferrably in excess of 70% by weight.

13. The process according to claim 12 in which the powdered form of the bentonite is preferably of a size that between 95% and 98% will pass through 200 mesh U.S. Standard screen and of the remainder through a screen having a particle size of at least 80 mesh and preferrably having at least 75% to 98% by weight of the powdered bentonite passing through a screen having a 325 mesh.

14. The process according to claim 12 in which the moisture content of the bentonite powder may exceed 3% by weight, but is preferably less than 3% by weight.

15. The process according to claim 13 in which the moisture content of the bentonite powder may exceed 3% by weight, but is preferably less than 3% by weight.

16. The process according to claim 1 which includes the additional step of adding a swelling-enhancing catalyst to the bentonite.

17. The process according to claim 1 in which the resultant prill size is between 1.0 mm and 5.0 mm diameter.

* * * * *